(12) United States Patent
Sorrentino et al.

(10) Patent No.: US 10,034,127 B2
(45) Date of Patent: Jul. 24, 2018

(54) NETWORK ASSISTANCE IN GROUPCAST TRANSMISSION

(71) Applicant: Telefonaktiebolaget LM Ericsson (Publ), Stockholm (SE)

(72) Inventors: Stefano Sorrentino, Solna (SE); Qingyu Miao, Beijing (CN); Iana Siomina, Täby (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 38 days.

(21) Appl. No.: 15/116,129

(22) PCT Filed: Mar. 19, 2014

(86) PCT No.: PCT/SE2014/050327
§ 371 (c)(1),
(2) Date: Aug. 2, 2016

(87) PCT Pub. No.: WO2015/142232
PCT Pub. Date: Sep. 24, 2015

(65) Prior Publication Data
US 2017/0150302 A1    May 25, 2017

(51) Int. Cl.
| H04W 4/02 | (2018.01) |
| H04W 76/02 | (2009.01) |
| H04W 76/00 | (2018.01) |
| H04W 4/06 | (2009.01) |
| H04L 12/18 | (2006.01) |
| H04W 8/00 | (2009.01) |

(Continued)

(52) U.S. Cl.
CPC .............. *H04W 4/02* (2013.01); *H04L 1/08* (2013.01); *H04L 1/1607* (2013.01); *H04L 12/189* (2013.01); *H04L 12/1854* (2013.01); *H04W 4/06* (2013.01); *H04W 8/005* (2013.01); *H04W 76/002* (2013.01); *H04W 76/023* (2013.01); *H04W 76/14* (2018.02); *H04W 76/40* (2018.02)

(58) Field of Classification Search
None
See application file for complete search history.

(56) References Cited

U.S. PATENT DOCUMENTS

| 9,717,069 B2 * | 7/2017 | Zhou ................... H04W 72/005 |
| 2008/0107076 A1 * | 5/2008 | Ramachandran ....... H04L 45/02 370/331 |

(Continued)

FOREIGN PATENT DOCUMENTS

WO    2013013412 A1    1/2013

OTHER PUBLICATIONS

International Search Report and Written Opinion dated Dec. 12, 2014 for International Application Serial No. PCT/SE2014/050327, International Filing Date—Mar. 19, 2014 consisting of 13-pages.

*Primary Examiner* — Eunsook Choi
(74) *Attorney, Agent, or Firm* — Patent Portfolio Builders, PLLC

(57) ABSTRACT

A radio network node for assisting in groupcast transmission between a first user equipment capable of device-to-device operation, D2D UE, and a group of target D2D UEs. A target D2D UE, as well as methods therein are also provided. Coverage is increased by assisting in groupcast transmission coverage. Embodiments provide improved spectral efficiency and/or improved communication reliability.

17 Claims, 5 Drawing Sheets

(51) Int. Cl.
*H04L 1/08* (2006.01)
*H04L 1/16* (2006.01)
*H04W 76/14* (2018.01)
*H04W 76/40* (2018.01)

(56) References Cited

U.S. PATENT DOCUMENTS

| | | | |
|---|---|---|---|
| 2011/0159799 A1* | 6/2011 | Chen | H04L 1/1867 |
| | | | 455/3.01 |
| 2012/0140677 A1* | 6/2012 | Choi | H04W 4/20 |
| | | | 370/254 |
| 2012/0165990 A1* | 6/2012 | McCormack | H04L 12/282 |
| | | | 700/275 |
| 2013/0150061 A1* | 6/2013 | Shin | H04W 4/005 |
| | | | 455/450 |
| 2013/0163520 A1 | 6/2013 | Kimura | |
| 2013/0250771 A1 | 9/2013 | Yu et al. | |
| 2013/0322413 A1 | 12/2013 | Pelletier et al. | |
| 2013/0324114 A1 | 12/2013 | Raghothaman et al. | |
| 2014/0328329 A1* | 11/2014 | Novlan | H04W 72/042 |
| | | | 370/336 |
| 2015/0043398 A1* | 2/2015 | Fwu | H04L 5/14 |
| | | | 370/280 |
| 2015/0131475 A1* | 5/2015 | Van Phan | H04W 8/26 |
| | | | 370/254 |
| 2015/0133132 A1* | 5/2015 | Li | H04L 1/0002 |
| | | | 455/450 |
| 2015/0382252 A1* | 12/2015 | Yu | H04W 8/005 |
| | | | 370/331 |
| 2016/0353478 A1* | 12/2016 | Kim | H04W 72/12 |

\* cited by examiner

NETWORK ASSISTANCE IN GROUPCAST TRANSMISSION

TECHNICAL FIELD

This disclosure relates to groupcast transmission. In more particular, it relates to network assistance in groupcast transmission.

BACKGROUND

Recent developments of 3GPP Long term evolution (LTE) facilitate accessing local Internet protocol (IP) based services in the home, office, public hot spot or even outdoor environments. Local IP access and local connectivity involving direct communication between devices in the close proximity of each other, has gained considerable interest. Close proximity is here typically less than a few tens of meters, but sometimes up to a few hundreds of meters.

This direct or device-to-device (D2D) mode of communication enables a number of potential gains over traditional cellular techniques, because D2D devices are typically much closer to one another than cellular devices having to communicate via cellular access points, such as eNodeBs, are.

Two potential gains, capacity gain and peak rate gain are noted. Since radio resources, e.g. Orthogonal frequency division multiplexing (OFDM) resource blocks, between the D2D layer and cellular layer may be reused, a reuse gain can be obtained. Due to the proximity and potentially favourable propagation conditions high peak rates can be achieved, for which reason a proximity gain can be obtained.

In addition, direct D2D communication allows UEs to sense their proximity, enabling a number of proximity-based services and applications.

Recently, device-to-device (D2D) communications as an underlay to cellular networks have been proposed as a means to take advantage of the proximity of communicating devices and at the same time to allow devices to operate in a controlled interference environment. It has been suggested that device-to-device communication can share the same spectrum as the cellular system, for example by reserving some of the cellular uplink resources for device-to-device purposes.

Allocating dedicated spectrum for device-to-device purposes is however a less likely alternative as spectrum is a scarce resource. Sharing between device-to-device services and cellular services is more flexible and provides higher spectrum efficiency than using dedicated spectrum.

Devices wanting to communicate, or even just discover each other, typically need to transmit control signalling. One example of such control signalling is the so-called beacon or discovery signal, which at least carries some form of identity of the device transmitting the signal and which is transmitted by a device wanting to be discoverable by other devices. Other devices may scan for the beacon signal, and once they have detected the beacon signal, they can take the appropriate action, for example to try to initiate a connection setup with the device transmitting the beacon signal.

For certain communication modes, e.g., connectionless communication, typically employed for groupcast and broadcast transmission, the beacon signal might carry a scheduling assignment indicating an associated data transmission to potential receivers. Connectionless communication is typically a unidirectional communication mode that does not require acknowledged connection setup.

Communication may be classified in different types being unicast, broadcast, and groupcast/multicast. Unicast is used to describe communication where a piece of information is sent from one point, i.e. a single source, to another point being a specified destination. In this case there is just one sender, and one receiver.

Communication where a single device is transmitting a message to all other devices in a given address range, is described by broadcast.

Groupcast/Multicast is used to describe communication where a piece of information is sent from one or more points to a set of other points. In this case there may be one or more senders, and information is distributed to a set of receivers. The set may however comprise no receivers or any other number of receivers.

The format of multicast packets is identical to that of unicast packets and is distinguished only by the use of a special class of destination address. Unlike broadcast transmission, multicast clients receive a stream of packets only if they have previously elected to do so, for example by joining the specific multicast group address.

A straightforward way to perform D2D groupcasting is to let a UE broadcast via a data channel to a group of UEs. The broadcasting UE may be under network coverage, but it is not a necessity. The UEs of the group of UEs which are within radio proximity of the transmitter will receive the transmission. A clear disadvantage is that UEs of the group which are not in radio proximity of the transmitter will accordingly not be reached.

There is hence a need for a solution addressing one or more of these issues as discussed above.

SUMMARY

It is an object of exemplary embodiments to address at least some of the issues outlined above, and this object and others are achieved by a radio network node, a user equipment capable of device-to-device operation (D2D UE) and methods therein, according to the appended independent claims, and by embodiments of the exemplary embodiments according to the dependent claims.

According to an aspect, the exemplary embodiments provide a radio network node capable of assisting in groupcast transmission between a first user equipment capable of device-to-device operation, D2D UE and a group of target D2D UEs. The radio network node comprises means for receiving, means for transmitting, and means for controlling. The means for receiving is configured to receive a groupcast signal comprising D2D user plane data from the first D2D UE. In addition, the means for controlling is configured to determine the group of target D2D UEs for groupcast transmission based at least on the received groupcast signal. The means for transmitting is configured to relay the D2D user plane data by use of cellular communication to target D2D UEs of the group of target D2D UEs.

According to another aspect, the exemplary embodiments provide a method in a radio network node for assisting in groupcast transmission between a first D2D UE and a group of target D2D UEs. The method comprises receiving a groupcast signal comprising D2D user plane data from the first D2D UE. The method also comprises determining the group of target D2D UEs for the groupcast transmission, based at least on the received groupcast signal. In addition, the method comprises relaying, by use of cellular communication, the D2D user plane data to target D2D UEs of the group of target D2D UEs.

According to yet another aspect, the exemplary embodiments provide a target D2D UE comprising means for receiving, means for transmitting and means for controlling.

The means for receiving is configured to receive by direct communication from a transmitting D2D UE a groupcast signal comprising D2D user plane data from the transmitting D2D UE. The means for controlling is configured to determine whether the received signal is correctly or incorrectly received. The means for transmitting is configured to transmit an indication to a radio network node indicating whether the received signal was correctly or incorrectly received.

According to still yet another aspect, the exemplary embodiments provide a method in a target D2D UE. The method comprises receiving by direct communication from a first D2D UE a groupcast signal comprising D2D user plane data from the first D2D UE. The method also comprises determining whether the received signal is correctly or incorrectly received. In addition, the method comprises transmitting an indication to a radio network node, indicating whether the transmission signal was correctly or incorrectly received.

The exemplary embodiments enables hybrid direct/network routing paths by relaying via one or more radio network nodes for achieving group communication to more members of a group and/or with better spectral efficiency and/or better reliability.

Another advantage with the exemplary embodiments in that they allow better network control of groupcast communication.

BRIEF DESCRIPTION OF THE DRAWINGS

Embodiments will now be described in more detail, and with reference to the accompanying drawings, in which.

DETAILED DESCRIPTION

In the following description, different embodiments of the exemplary embodiments will be described in more detail, with reference to accompanying drawings. For the purpose of explanation and not limitation, specific details are set forth, such as particular examples and techniques in order to provide a thorough understanding.

In this description unicast and broadcast considered as particular cases of group communication or groupcast, also known as multicast, where groups are respectively formed by one or all entities, for instance UEs. For broadcast, the notion of all UEs may be limited to a specific geographical area or to a number of cells.

It is noted that unicast, groupcast, and/or broadcast may be implemented at Layer 1/2 or at higher layers.

The present disclosure is related to assisting in groupcast communication for enhancing groupcast communication, particularly enabling hybrid direct/network routing paths by relaying via one or more radio network nodes for achieving group communication to more members of a group and/or with better spectral efficiency and/or better reliability.

It is noted that relaying as herein used may comprise a combination of core network routing and cellular radio access.

The disclosure will hence relate to means for enhancing groupcast communication, particularly enabling hybrid routing paths via tone or more radio network nodes of the network, as well as by direct communication, for achieving group communication to more members of the group and/or with better spectral efficiency and/or better reliability, as indicated above.

Further, a group of target UEs for a groupcast communication may be characterized by one or more of the following characteristics: a set of identities of target UEs, by location area of the target UEs, by serving cell ID of the target UEs, by application identity for the target UEs, for example, target UEs running a certain application potentially comprise the group, by target UE category or type, for example, public safety target UEs, by the support of a specific capability by the target UEs, etc. A large number of ways to characterize a group of target UEs can thus be envisaged.

In the following various scenarios of network assisted groupcast communication will be presented with reference to FIGS. 1 to 4.

The scenarios of network assisted groupcast communication may also further be combined with each other in any constellation.

Figure 1:
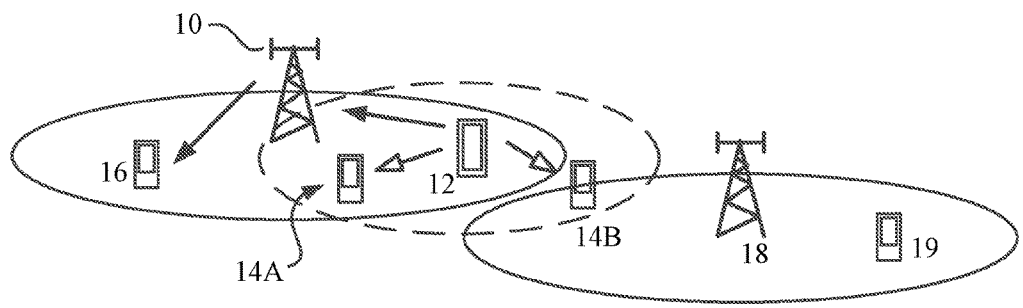
FIGS. 1 to 4 schematically illustrate various communication scenarios in a communication network, related to embodiments of the exemplary embodiments.

FIG. 1 schematically presents one scenario of network assisted groupcast communication. FIG. 1 comprises a first eNodeB 10, being one example of a radio network node, a transmitting user equipment (UE) capable of device-to-device (D2D) operation (D2D UE) 12 and a first and a second target D2D UE 14A, 14B, being in close radio proximity to the transmitting D2D UE 12. Moreover, FIG. 1 also comprises another target D2D UE 16 within network coverage of the first eNodeB 10 but not in close radio proximity of the transmitting D2D UE 12. FIG. 1 further comprises a second eNodeB 18, again being one example of a radio network node, serving a cell different from the one served by the first eNodeB 10. Moreover, FIG. 1 further comprises yet another target D2D UE 19 under network coverage of the second eNodeB 18. This yet another target D2D UE 19 is not in close radio proximity of the transmitting D2D UE 12. It can be noted that the second target D2D UE 14B cannot be served by the first eNodeB 10, whereas it can be served by the second eNodeB 18.

In this scenario of FIG. 1 the transmitting D2D UE 12 groupcasts a signal by direct D2D transmission. This groupcast signal reaches the first 14A and the second 14B target D2D UE, as they are in close radio proximity of the transmitting D2D UE 12. The groupcast signal as transmitted by the transmitting D2D UE 12 is however also received by the first eNodeB 10. The eNodeB 10 may then determine which receivers are the intended receivers of the groupcast signal. The eNodeB 10 can therefore determine the target receivers of the groupcast signal. This determination may be performed in various ways, for instance by paging within the cell served by the eNodeB 10 all D2D UEs belonging to the group, defined by the groupcast. Alternatively, determination of target D2D UEs can be performed by determining that all D2D UEs within the cell coverage of the first eNodeB 10 are target receivers, which may be the case with broadcast. Having determined which entities are target entities, the first eNodeB 10 relays the groupcast signal comprising data from the transmitting D2D UE 12 to all target D2D UE of the group in question or within the cell. In FIG. 1, the first eNodeB 10 relays the groupcast signal to said another target D2D UE 16, being a member of the group of target D2D UE and being within the cell served by the first eNodeB 10.

In a slightly different scenario, said another target D2D UE 16 can be in close proximity of the transmitting D2D UE 12, and hence receive a groupcast signal direct communication from the transmitting D2D UE 12, in addition to receiving a groupcast transmission by relaying said signal by the eNodeB 10. In this case, said another target D2D UE 16 may attempt detecting both of them and discard the signal that does not perform correctly in a cyclic redundancy check (CRC).

When relaying a signal to target D2D UEs, the first eNodeB 10 may relay the signal using unicast and multiple connections, or by using broadcast without establishing dedicated logical connections to multiple of receivers.

Figure 2:
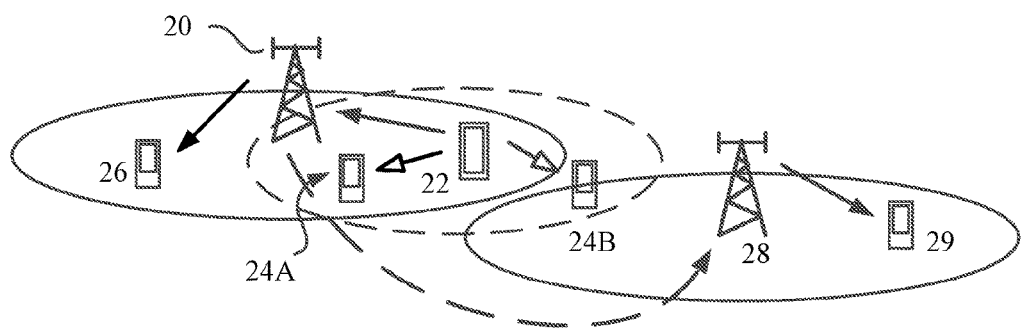

FIG. 2 schematically presents another scenario of network assisted groupcast communication. Similar to FIG. 1, FIG. 2 comprises a first eNodeB 20, a transmitting D2D UE 22, and a first and a second target D2D UE 24A, 24B being in close radio proximity to the transmitting D2D UE 22. FIG. 2 also comprises another target D2D UE 26 within the cell of the first eNodeB 20 but not in close radio proximity of the transmitting D2D UE 22. FIG. 2 further comprises a second eNodeB 28, serving a cell different from the one served by the first eNodeB 20. Moreover, FIG. 2 further comprises yet another target D2D UE 29 under network coverage of the second eNodeB 28. This yet another target D2D UE 29 is not in close radio proximity of the transmitting first D2D UE 22. It can be noted that the second target D2D UE 24B cannot be served by the first eNodeB 20, whereas it may be served by the second eNodeB 28.

Similar to the scenario as illustrated in FIG. 1, the scenario of FIG. 2 comprises groupcasting of a signal by direct D2D transmission by the transmitting D2D UE 22. This groupcast signal reaches the first 24A and the second 24B D2D UE. The groupcasted signal is also received by the first eNodeB 20, which can determine which are the intended receivers of the groupcast signal. The eNodeB 20 can therefore determine the target receivers of the groupcast signal. This determination may be performed in various ways, for instance by paging within the cell served by the first eNodeB 20 all D2D UEs belonging to the group, defined by the groupcast. Determining the target D2D UEs may also comprise determining target D2D UEs in multiple cells. The first eNodeB 20 may thus page target D2D UEs in more than one cell.

In FIG. 2, the second eNodeB 28 receives the groupcast signal using an inter-eNodeB backhaul connection, for instance via X2 interface indicated between the first 20 and the second 28 eNodeB. The second eNodeB 28 then determines target D2D UEs for the groupcast signal, and relays the groupcast signal to target D2D UEs being served by the second eNodeB 28, as exemplified by said yet another target D2D UE 29.

The groupcast signal can also be relayed to said another target D2D UE 26, being served by the first eNodeB 20, similar to the relaying of the groupcast signal as described above in connection with FIG. 1.

Upon relaying a groupcast signal, a radio network node, such as the eNodeB 20 or 28, may decide whether and where to deliver the data by multimedia broadcast multicast service (MBMS), where the MBMS area may over more than one cell, or by unicast or other cellular group communication methods.

Figure 3:
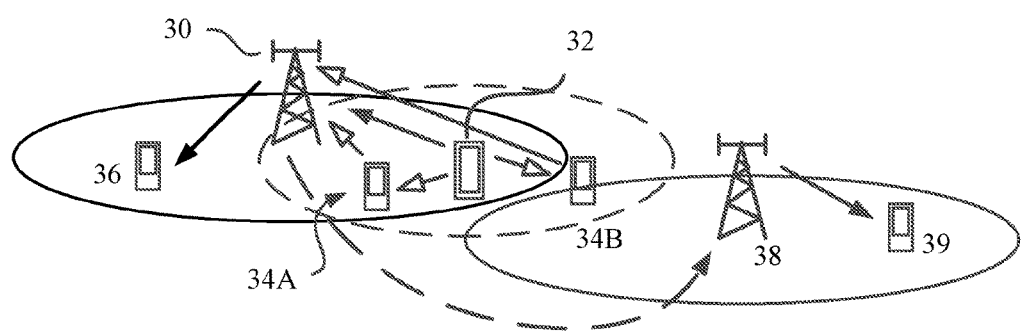

FIG. 3 schematically presents a similar but yet another scenario of network assisted groupcast communication. Similar to FIGS. 1 and 2, FIG. 3 comprises a first eNodeB 30, a transmitting D2D UE 32, and a first and a second target D2D UE 34A, 34B being in close radio proximity to the transmitting D2D UE 32. FIG. 3 also comprises another target D2D UE 36 within the cell of the first eNodeB 30 but not in close radio proximity of the transmitting D2D UE 32. FIG. 3 further comprises a second eNodeB 38, serving a cell different from the one served by the first eNodeB 30. Moreover, FIG. 3 further comprises yet another target D2D UE 39 under network coverage of the second eNodeB 38. This yet another target D2D UE 39 is not in close radio proximity of the transmitting first D2D UE 32. It here also noted that the second target D2D UE 34B cannot be served by the first eNodeB 30, whereas it is under network coverage of the second eNodeB 38.

The difference between the scenario as presented in FIG. 3 and the scenario as presented in FIG. 2, is that the one of FIG. 3 comprises the possibility of uplink (UL) signalling from target D2D UEs of the group of target D2D UEs towards an eNodeB. If the first target D2D UE 34A has successfully detected the groupcast signal transmitted using direct communication, said first target D2D UE 34A signals an indication thereof in UL to the first eNodeB 30. Similarly, if the second target D2D UE 34B has successfully detected the groupcast signal transmitted using direct communication by the first eNodeB 30, said second target D2D UE 34B signals an indication thereof in UL to the first eNodeB 30. This UL signalling may use the UL radio link for cellular communication or D2D radio link, the respective D2D UE and the first eNodeB 30.

Based on feedback from the respective D2D UEs, signalled as described above, the first eNodeB 30 may then avoid routing the groupcast signal towards such D2D UEs, since these D2D UEs in close radio proximity to the transmitting D2D UE 32 have already detected the groupcast signal transmitted by direct communication from the transmitting D2D UE 32.

A network comprising eNodeBs can thus improve spectrum utilization by avoiding relaying redundant groupcast signals transmissions to D2D UEs that have already successfully detected such signals.

An eNodeB may alternatively determine to relay a groupcast signal to D2D UEs of a group of D2D UEs which have not acknowledged reception of the signal.

This possibility to provide uplink signalling from target D2D UEs of the group of target D2D UEs towards an eNodeB, may in the same way be applied to the scenario as illustrated in FIG. 1, and described above.

It should herein also be mentioned that a transmitting D2D UE may be configured to signal an intention to commence groupcast transmission or group communication session to an eNodeB. This intention may comprise information sufficient for the eNodeB to determine target D2D UEs, by for instance identifying target D2D UEs. The eNodeB may then use this received intention, comprising said information, to setup resources for possibly relaying information to target D2D UEs. The transmitting D2D UE that can transmit an intention for groupcast communication may use a regular long term evolution (LTE) unicast connection, for cellular communication, to transfer data for the groupcast communication to the network, for example to its serving eNodeB via one or more serving cells. In another alternative, the serving eNodeB may receive, possibly via D2D radio link, and decode a data stream comprising data intended for groupcast communication when the D2D UE commences group communication.

Figure 4:
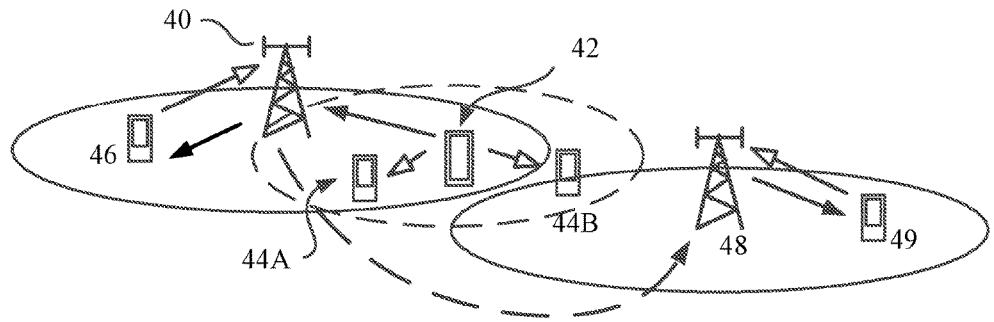

FIG. 4 schematically presents a similar but yet another scenario of network assisted groupcast communication. Similar to the preceding Figures, FIG. 4 comprises a first eNodeB 40, a transmitting D2D UE 42, and a first and a second target D2D UE 44A, 44B being in close radio proximity to the transmitting D2D UE 42. FIG. 4 also comprises another target D2D UE 46 within the cell of the first eNodeB 40 but not in close radio proximity of the transmitting D2D UE 42. FIG. 4 further comprises a second eNodeB 48, serving a cell different from the one served by the first eNodeB 40. Moreover, FIG. 4 further comprises yet another target D2D UE 49 under network coverage of the second eNodeB 48. This yet another target D2D UE 49 is not in close radio proximity of the transmitting first D2D UE 42. It here also noted that the second target D2D UE 44B cannot be served by the first eNodeB 40, whereas it is under network coverage of the second eNodeB 48.

There are large similarities between the scenarios as described in connection to FIGS. 3 and 4. As in described in connection to FIG. 3, the scenario presented in FIG. 4 comprises a possibility of uplink (UL) signalling from target D2D UEs of the group of target D2D UEs towards an eNodeB. If a target D2D UE of a group of target D2D UEs has failed to detect reception of a groupcast signal, for example in one or more specific packets or messages, this D2D UE can signal such an event to an eNodeB. This may be in form of a negative acknowledgement (NACK).

The eNodeB receiving the NACK may then assist such D2D UEs in various ways. The eNodeB may again relay, i.e. retransmit, the failed packet(s) or signal/messages. The eNodeB may alternatively, transmit information useful to improve detection by the D2D UE of the failed packet(s), such as additional redundancy for hybrid automatic repeat request (HARQ) or radio link control (RLC) combining. Network assistance in this sense may be provided via a D2D radio link, e.g., UL spectrum for D2D communication) or via a downlink (DL) for cellular communication.

In FIG. 4, feedback from target D2D UEs about failure to successfully detect reception is illustrated by said another D2D UE 46 transmitting a response to the first eNodeB 40, and by said yet another D2D UE 49 transmitting a response to the second eNodeB 48.

In the above cases in connection to FIG. 4, the eNodeBs may need to allocate memory and store signals or messages received from the transmitting D2D UE 42 for a certain amount of time, in order to be able to assist in groupcast communication to target D2D UEs of the group of D2D UEs with retransmissions of failed packets, as described above.

As alternative to the scenarios described above can be noted, the radio network node, such as an eNodeB, performing relaying to assist in groupcast transmission and support D2D communication may adapt at least one of its transmitter configuration parameters, for example the transmission power, adaptively to the characteristic of the group of target D2D UEs. For example, if the characteristic is a certain location area, the transmitter may adjust, i.e. decrease or increase, the transmission power, antenna direction and/or antenna beam to ensure that the groupcast signal being relayed can be received in a target area of target D2D UEs.

Herein, eNodeB has been used as an example of a radio network node. However, as herein used eNodeB may also refer to one or more network nodes. The role of an eNodeB may be played by other nodes or wireless devices capable of taking such a role in D2D communication, a node coordinating D2D communication, cluster head engaged in D2D communication, D2D relay/repeaters, etc.

D2D UE as herein used denotes a user equipment capable of device-to-device operation/communication.

Figure 5:
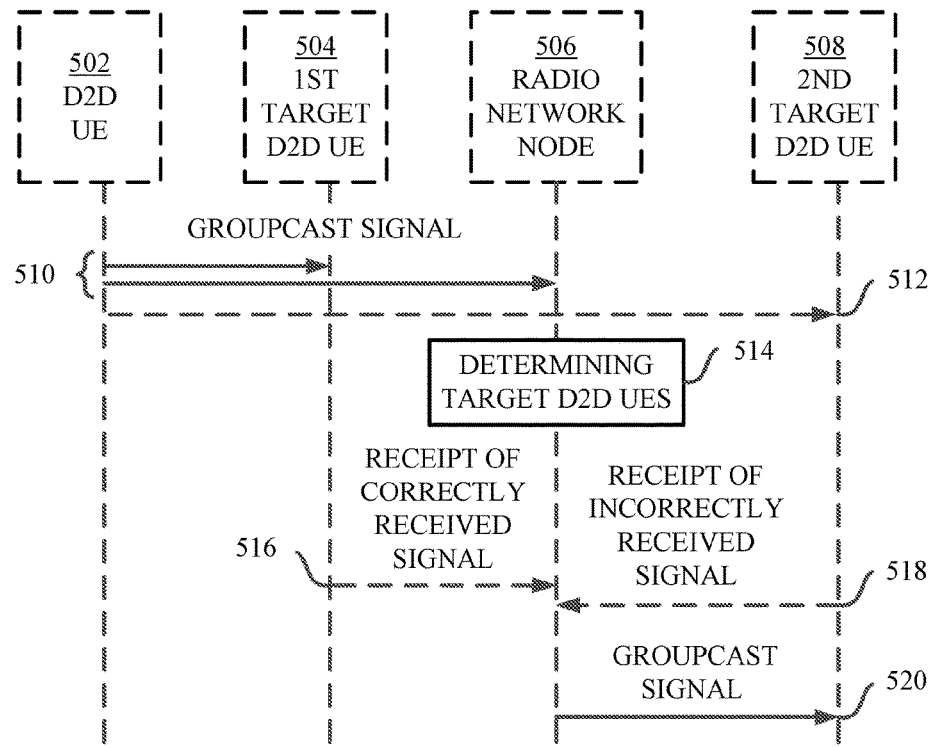
FIGS. 5 and 6 present handshake diagrams of signalling according to embodiments of the exemplary embodiments.

FIG. 5 presents a first handshake diagram of signaling between a transmitting D2D UE 502, a first target D2D UE 504, a radio network node 506, such as an eNodeB, and a second target D2D UE 508, related to some embodiments of the exemplary embodiments.

In 510, the transmitting D2D UE 502 transmits a groupcast signal to the first target D2D UE 504, and the radio network node 506.

In 512, the transmitting D2D UE 502 transmits a groupcast signal to the second target D2D UE 508.

In 514, the radio network node 506 determines target D2D UEs for groupcast transmission based at least on the received groupcast signal.

In 516, the radio network node 506 may receive a receipt of a correctly received groupcast signal from the first target D2D UE 504.

In 518, the radio network node 506 may receive a receipt of an incorrectly received groupcast signal from the second target D2D UE 508.

In 520, the radio network node 506 relays the groupcast signal to the second target D2D UE 508, since the groupcast signal was not properly detected in 512.

The groupcast signal as transmitted in 510, 512 may be transmitted by direct communication.

Figure 6:
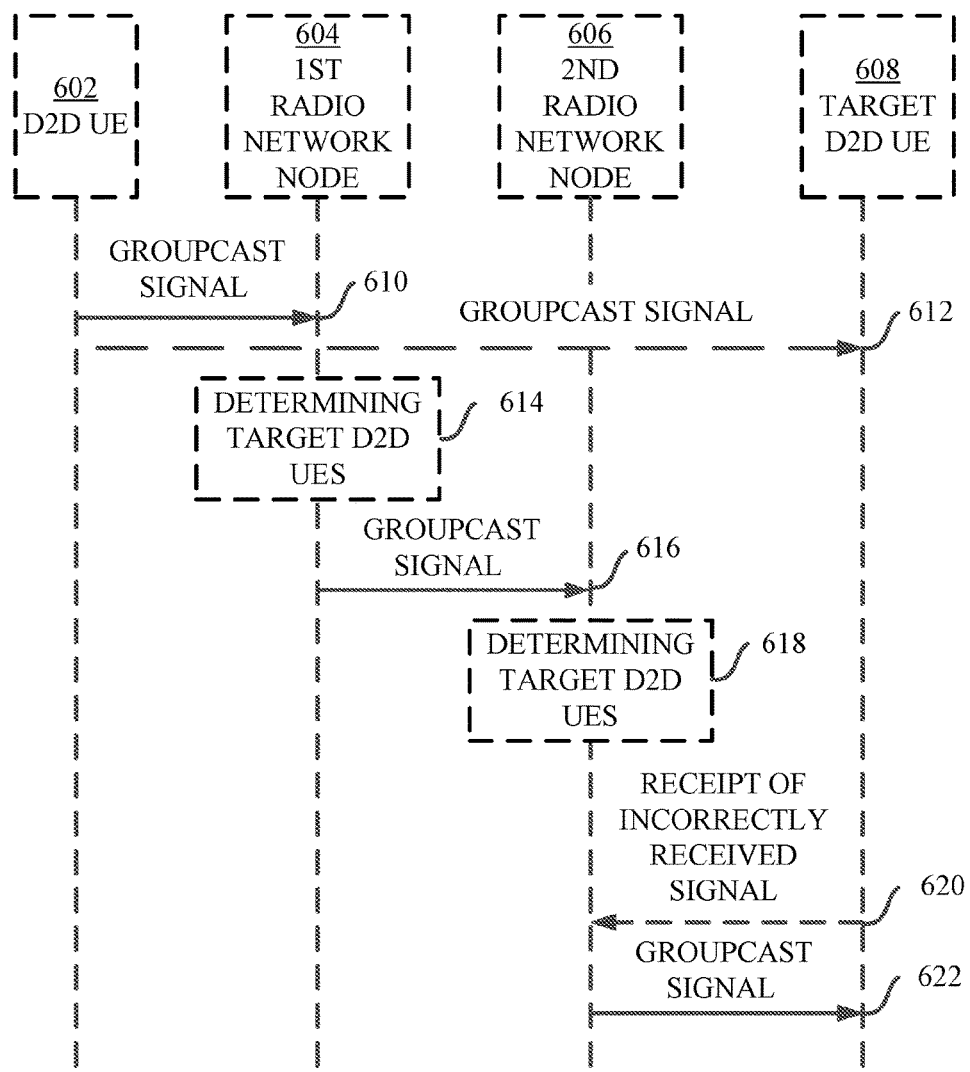

FIG. 6 presents a second handshake diagram of signaling between a transmitting D2D UE 602, a first radio network node 604, such as an eNodeB, a radio network node 606, such as an eNodeB, and a target D2D UE 608, related to some embodiments of the exemplary embodiments. It should be noted that the target D2D UE 608 may be served by the second radio network node 606, but not by the first radio network node 604.

In 610, the transmitting D2D UE 602 transmits a groupcast signal to the first radio network node 604.

In 612, the transmitting D2D UE 602 transmits a groupcast signal to the target D2D UE 608.

In 614, the first radio network node 604 may determine target D2D UEs for groupcast transmission based at least on the received groupcast signal.

In 616, the first radio network node 604 relays the groupcast signal to the second radio network node 606, typically via a backhaul connection.

In 618, the second radio network node 606 may determine the target D2D UEs for the groupcast signal.

In 620, the second radio network node 606 may receive a receipt of an incorrectly received groupcast signal.

In 622, the second radio network node 606 relays the groupcast signal to the target D2D UE 608, for the reason that the groupcast signal was not properly received in 612.

Figure 7:
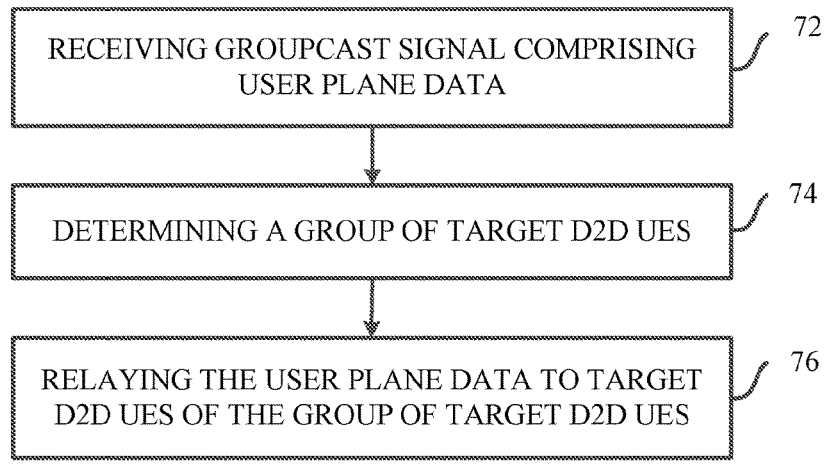
FIGS. 7 and 8 illustrate flow charts of methods according to embodiments of the exemplary embodiments.

FIG. 7 presents a flow chart of a method in a radio network node for assisting in groupcast transmission between a first D2D UE and a group of target D2D UEs.

In 72, the flow chart comprises receiving a groupcast signal comprising D2D user plane data from the first D2D UE.

In 74, the flow chart comprises determining the group of target D2D UEs for the groupcast transmission, based at least on the received groupcast signal.

In 76, the flow chart comprises relaying, by use of cellular communication, the D2D user plane data to target D2D UEs of the group of target D2D UEs.

The method may comprise receiving the groupcast signal from over a D2D interface or by using an uplink cellular interface.

Determining the group of target D2D UEs within the method, may comprise determining the identity of one or more target D2D UEs of the group of target D2D UEs.

Determining the group of target D2D UEs within the method, may comprise determining the position or presence of one or more target D2D UEs of the group of target D2D in a cell served by the radio network node.

The method may comprise receiving an indication that a target D2D UE, of the group of target D2D UEs, has by direct communication from the first D2D UE correctly or incorrectly received the groupcast signal.

The method may comprise receiving the groupcast signal via another radio network node having received the groupcast signal from the first D2D UE.

The method may comprise receiving results from determining the group of target D2D UEs for groupcast transmission from said another radio network node.

The method may comprise transmitting the D2D user plane data by using a cellular communication shared channel to a target D2D UEs, of the group of target D2D UEs, which target D2D UE has incorrectly received the groupcast signal by direct communication from the first D2D UE.

The method may comprise receiving the groupcast signal from the first D2D UE.

Figure 8:
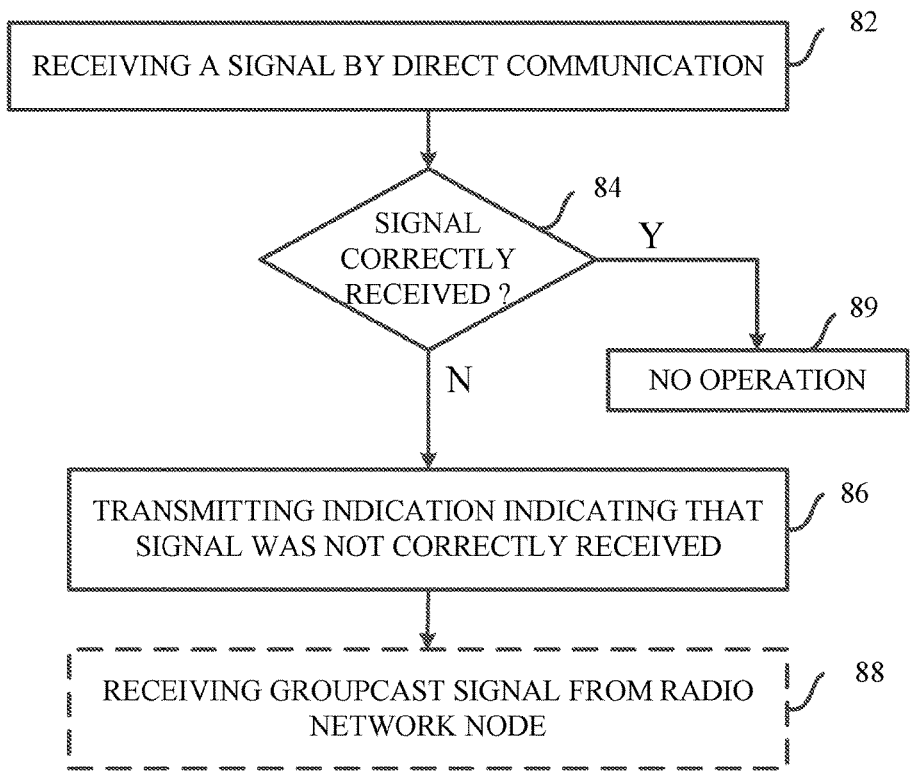

FIG. 8 presents a flow chart of a method in a target D2D UE.

In 82, the flow chart comprises receiving by direct communication from a first D2D UE a groupcast signal comprising D2D user plane data from the first D2D UE.

In 84, the flow chart comprises determining whether the received signal is correctly or incorrectly received.

In 86, the flow chart comprises transmitting an indication to a radio network node, indicating whether the transmission signal was correctly or incorrectly received.

In 88, the flow chart may comprise receiving the D2D user plane data comprised in a groupcast signal from the radio network node by using of a cellular communication shared channel, if the transmitted indication indicated that the signal received by direct communication was incorrectly received.

Figure 9:
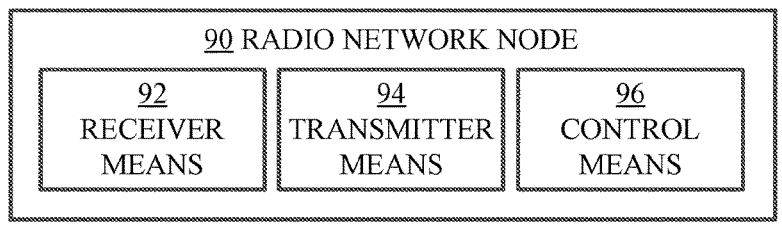
FIGS. 9 to 12, schematically illustrate apparatuses according to embodiments of the exemplary embodiments.

FIG. 9 schematically presents a radio network node 90 capable of assisting in groupcast transmission between a first D2D UE and a group of target D2D UEs. The radio network node 90 comprises receiving means 92, transmitting means 94 and control means 96. The receiving means 92 is configured to receive a groupcast signal comprising D2D user plane data from the first D2D UE. The control means 96 is configured to determine the group of target D2D UEs for groupcast transmission based at least on the received groupcast signal. The transmitter means 94 is configured to relay the D2D user plane data by use of cellular communication to target D2D UEs of the group of target D2D UEs.

The receiver means 92 may further be configured to receive the groupcast signal over a device-to-device interface or by using an uplink cellular interface.

The control means 96 may further be configured to determine the identity of one or more target D2D UEs of the group of target D2D UEs.

The control means 96 may further be configured to determine one or more target D2D UEs of the group of target D2D UEs based on the position or presence of said one or more target D2D UEs in a cell served by the radio network node.

The receiver means 92 may further be configured to receive an indication indicating that a target D2D UE of the group of target D2D UEs has by direct communication correctly or incorrectly received the groupcast signal from the first D2D UE.

The receiver means 92 may further be configured to receive the groupcast signal via another radio network node having received the groupcast signal from the first D2D UE.

The receiver means 92 may further be configured to receive results from determining the group of target D2D UEs for groupcast transmission from said another radio network node.

The transmitter means 94 may further be configured to transmit the D2D user plane data by using a cellular communication shared channel to a target D2D UE of the group of target D2D UEs which target D2D UE has incorrectly received the groupcast signal by direct communication from the first D2D UE.

The receiver means 92 may further be configured to receive the groupcast signal from the first D2D UE.

The receiver means 92 may be an input unit, an interface or a receiving module.

The transmitter means 94 may be an output unit, an interface or a transmitting module.

Figure 10:
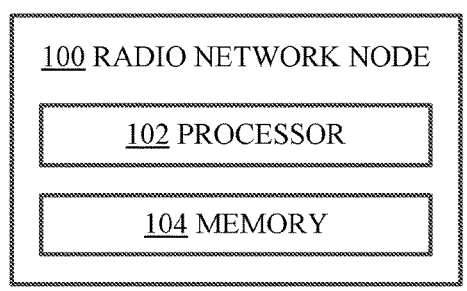

The control means 96 may be a control unit or a controlling module or a processor e.g. processor 102 of FIG. 10.

The radio network node 90 may further comprise an eNodeB.

FIG. 10 schematically presents a radio network node 100 capable of assisting in groupcast transmission between a first D2D UE and a group of target D2D UEs. The radio network node 100 comprises a processor 102 and a memory 104, said memory 104 containing instructions executable by said processor 102 whereby said radio network node is operative to receive a groupcast signal comprising D2D user plane data from the first D2D UE, to determine the group of target D2D UEs for the groupcast transmission, based at least on the received groupcast signal, and to relay, by use of cellular communication, the D2D user plane data to target D2D UEs of the group of target D2D UEs.

It should be mentioned that the radio network node 90 and radio network node 100 are not necessarily separated but maybe within a single radio network node.

The exemplary embodiments also comprise a computer program, comprising instructions which, when executed at least on a processor, cause the at least one processor to carry out the method of receiving a groupcast signal comprising D2D user plane data from the first D2D UE, determining the group of target D2D UEs for the groupcast transmission, based at least on the received groupcast signal, and relaying, by use of cellular communication, the D2D user plane data to target D2D UEs of the group of target D2D UEs.

Exemplary embodiments also comprise a carrier containing the computer program, wherein the carrier is one of an electronic signal, radio signal or computer readable storage medium.

Figure 11:
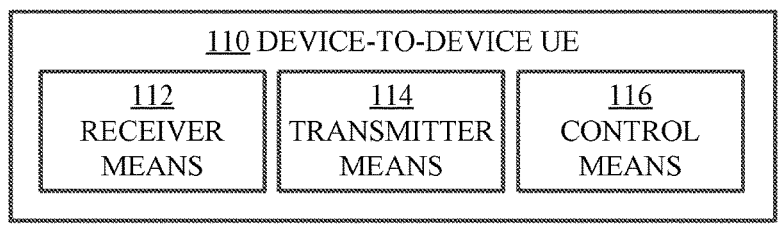

FIG. 11 schematically presents a UE capable of D2D operation (D2D UE) 110. The D2D UE 110 comprises receiver means 112, transmitter means 114 and control means 116. The receiver means 112 of the D2D UE 110 is configured to receive by direct communication from a transmitting D2D UE a groupcast signal comprising D2D user plane data from the transmitting D2D UE. The control means 116 is configured to determine whether the received signal is correctly or incorrectly received. The transmitter means 114 is configured to transmit an indication to a radio network node indicating whether the received signal was correctly or incorrectly received.

The receiver means 112 may further be configured to receive the D2D user plane data comprised in a groupcast signal from the radio network node by using a cellular communication shared channel, when the transmitted indication indicated that the signal received by direct communication was incorrectly received.

The receiver means 112 may be an input unit, an interface or a receiving module.

The transmitter means 114 may be an output unit, an interface or a transmitting module.

Figure 12:
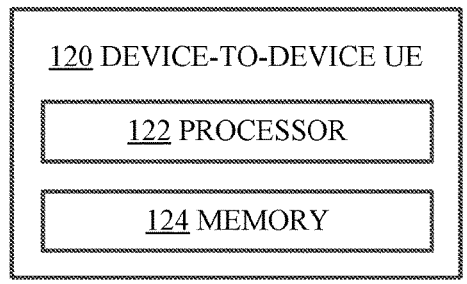

The control means 116 may be a control unit or a controlling module or a processor e.g. processor 122 of FIG. 12.

FIG. 12 schematically presents a UE capable of D2D operation (D2D UE) 120. The D2D UE 120 comprises a processor 122 and a memory 124, said memory 104 containing instructions executable by said processor 122 whereby said D2D UE is operative to receive by direct communication from a transmitting D2D UE a groupcast signal comprising D2D user plane data from the transmitting D2D UE, to determine whether the received signal is correctly or incorrectly received, and to transmit an indication to a radio network node, indicating whether the transmission signal was correctly or incorrectly received.

It should be mentioned that the D2D UE 110 and D2D 120 are not necessarily separated but maybe within a single D2D UE.

The exemplary embodiments also comprise a computer program, comprising instructions which, when executed at least on a processor, cause the at least one processor to carry out the method of receiving by direct communication from a transmitting D2D UE a groupcast signal comprising D2D user plane data from the transmitting D2D UE, determining whether the received signal is correctly or incorrectly received, and transmitting an indication to a radio network node, indicating whether the transmission signal was correctly or incorrectly received.

Exemplary embodiments also comprise a carrier containing said computer program, wherein the carrier is one of an electronic signal, radio signal or computer readable storage medium.

The exemplary embodiments have thus enabled hybrid direct/network routing paths by relaying via one or more radio network nodes for achieving group communication to more members of a group and/or with better spectral efficiency and/or better reliability.

Another advantage with exemplary embodiments in that they allow better network control of groupcast communication.

It may be further noted that the above described embodiments are only given as examples and should not be limiting to the present exemplary embodiments, since other solutions, uses, objectives, and functions are apparent within the scope of the embodiments as claimed in the accompanying patent claims.

ABBREVIATIONS

3GPP 3$^{rd}$ generation partnership project
D2D device-to-device
D2D UE user equipment capable of device-to-device operation
DL downlink
HARQ hybrid automatic repeat request
LTE long term evolution
MBMS multimedia broadcast multicast service
RLC radio link control
UE user equipment
UL uplink

The invention claimed is:

1. A radio network node for assisting in groupcast transmission between a first user equipment configured for device-to-device operation, D2D UE, and a group of target D2D UEs, the radio network node comprising a processor and a memory, the memory comprising computer executable instructions which when executed by the processor, causes the processor to:
   receive a groupcast signal comprising D2D user plane data from the first D2D UE;
   relay the D2D user plane data by use of cellular communication to target D2D UEs of the group of target D2D UEs; and
   determine the group of target D2D UEs for the groupcast transmission based at least on the received groupcast signal,
   wherein the computer executable instructions which when executed by the processor, further causes the processor to receive the groupcast signal via another radio network node having received the groupcast signal from the first D2D UE.

2. The radio network node according to claim 1, wherein the computer executable instructions which when executed by the processor, further causes the processor to receive the groupcast signal one of over a device-to-device interface and by using an uplink cellular interface.

3. The radio network node according to claim 1, wherein the computer executable instructions which when executed by the processor, further causes the processor to determine the identity of at least one target D2D UE of the group of target D2D UEs.

4. The radio network node according to claim 1, wherein the computer executable instructions which when executed by the processor, further causes the processor to determine at least one target D2D UE of the group of target D2D UEs based on the position and presence of said at least one target D2D UE in a cell served by the radio network node.

5. The radio network node according to claim 1, wherein the computer executable instructions which when executed by the processor, further causes the processor to receive an indication indicating that a target D2D UE of the group of target D2D UEs has by direct communication one of correctly received the groupcast signal from the first D2D UE and incorrectly received the groupcast signal from the first D2D UE.

6. The radio network node according to claim 1 wherein the computer executable instructions which when executed by the processor, further causes the processor to receive results from determining the group of target D2D UEs for the groupcast transmission from the another radio network node.

7. The radio network node according to claim 6, wherein the computer executable instructions which when executed by the processor, further causes the processor to transmit the D2D user plane data by using a cellular communication shared channel to a target D2D UE of the group of target D2D UEs which target D2D UE has incorrectly received the groupcast signal by direct communication from the first D2D UE.

8. The radio network node according to claim 1, wherein the radio network node is an eNodeB.

9. A method in a radio network node for assisting in groupcast transmission between a first device-to-device, D2D, user equipment, UE and a group of target D2D UEs, the method comprising:
   receiving a groupcast signal comprising D2D user plane data from the first D2D UE;
   receiving the groupcast signal via another radio network node having received the groupcast signal from the first D2D UE;

determining the group of target D2D UEs for the groupcast transmission, based at least on the received groupcast signal; and relaying by use of cellular communication, the D2D user plane data to target D2D UEs of the group of target D2D UEs.

10. The method according to claim 9, wherein the groupcast signal is received from one of over a D2D interface and by using an uplink cellular interface.

11. The method according to claim 9, wherein determining the group of target D2D UEs comprises determining the identity of at least one target D2D UE of the group of target D2D UEs.

12. The method according to claim 9, wherein determining the group of target D2D UEs comprises determining one of the position and presence of at least one target D2D UE of the group of target D2D UEs in a cell served by the radio network node.

13. The method according to claim 9, further comprising receiving an indication that a target D2D UE, of the group of target D2D UEs, has by direct communication from the first D2D UE one of correctly received the groupcast signal and incorrectly received the groupcast signal.

14. The method according to claim 9, further comprising receiving results from determining the group of target D2D UEs for the groupcast transmission from the another radio network node.

15. The method according to claim 14, further comprising transmitting the D2D user plane data by using a cellular communication shared channel to a target D2D UE, of the group of target D2D UEs, which target D2D UE has incorrectly received the groupcast signal by direct communication from the first D2D UE.

16. A target device-to-device, D2D, user equipment, UE, comprising a processor and a memory, the memory comprising computer executable instructions which when executed by the processor, causes the processor to:

receive by direct communication from a transmitting D2D UE a groupcast signal comprising D2D user plane data from the transmitting D2D UE;

determine whether the received groupcast signal is one of correctly and incorrectly received groupcast signal; and transmit an indication to a radio network node indicating whether the received signal was one of correctly and incorrectly received groupcast signal, wherein the computer executable instructions which when executed by the processor, further causes the processor to receive the D2D user plane data comprised in a groupcast signal from the radio network node by using a cellular communication shared channel, when the transmitted indication indicated that the signal received by direct communication was incorrectly received.

17. A method in a target device-to-device, D2D user equipment, UE, the method comprising:

receiving, by direct communication from a transmitting D2D UE, a groupcast signal comprising D2D user plane data from the transmitting D2D UE;

determining whether the received groupcast signal is one of correctly and incorrectly received groupcast signal;

transmitting an indication to a radio network node indicating whether the transmission signal was one of correctly and incorrectly received groupcast signal, and receiving the D2D user plane data comprised in a groupcast signal from the radio network node by using a cellular communication shared channel, when the transmitted indication indicated that the signal received by direct communication was incorrectly received.

* * * * *